Oct. 6, 1959 G. F. GARDNER 2,907,396
LOAD TRANSPORTING ATTACHMENT FOR AGRICULTURAL IMPLEMENTS
Filed May 21, 1956 3 Sheets-Sheet 1

INVENTOR.
GUY F. GARDNER
BY
ATTORNEYS.

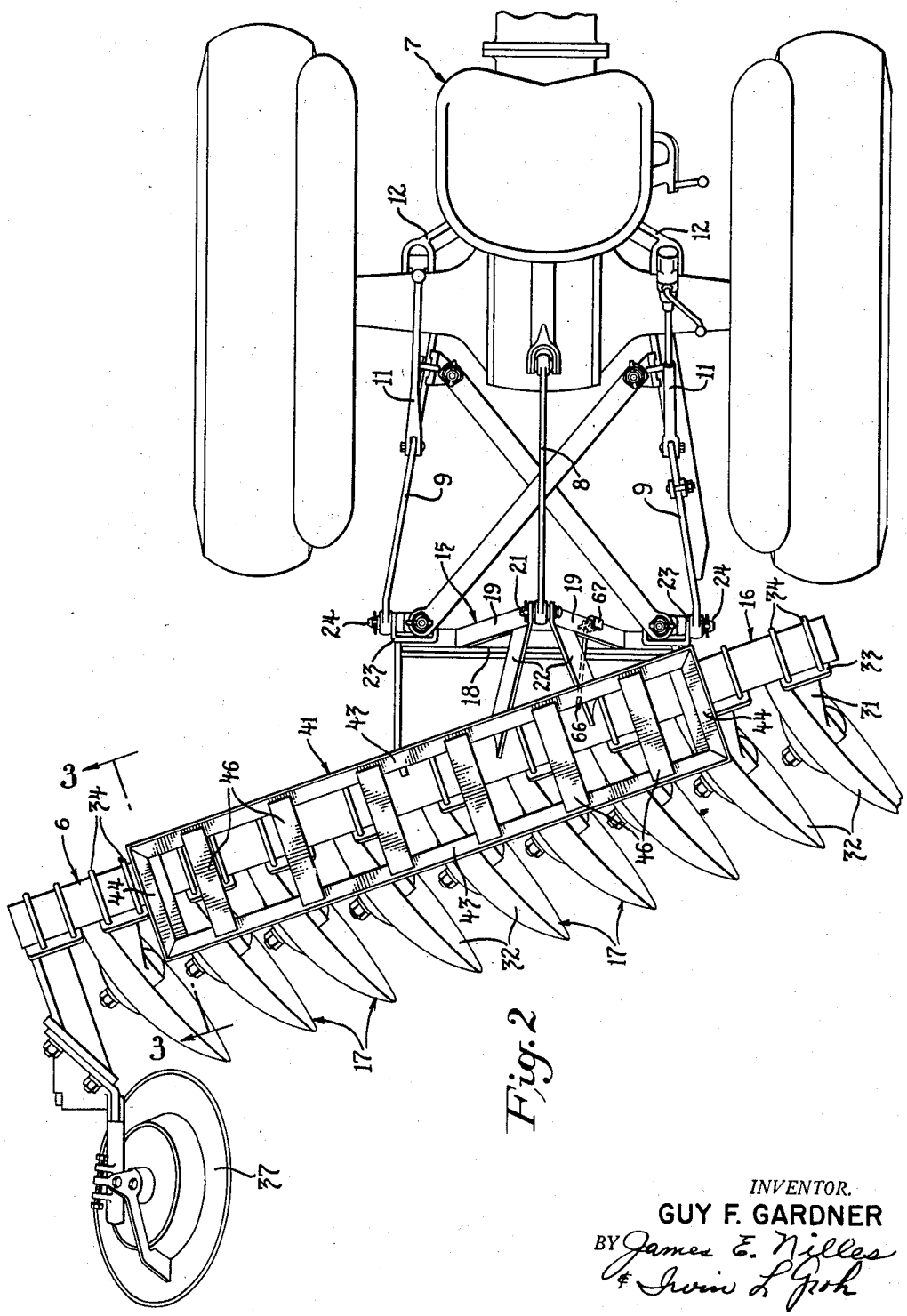

Oct. 6, 1959  G. F. GARDNER  2,907,396
LOAD TRANSPORTING ATTACHMENT FOR AGRICULTURAL IMPLEMENTS
Filed May 21, 1956  3 Sheets-Sheet 3
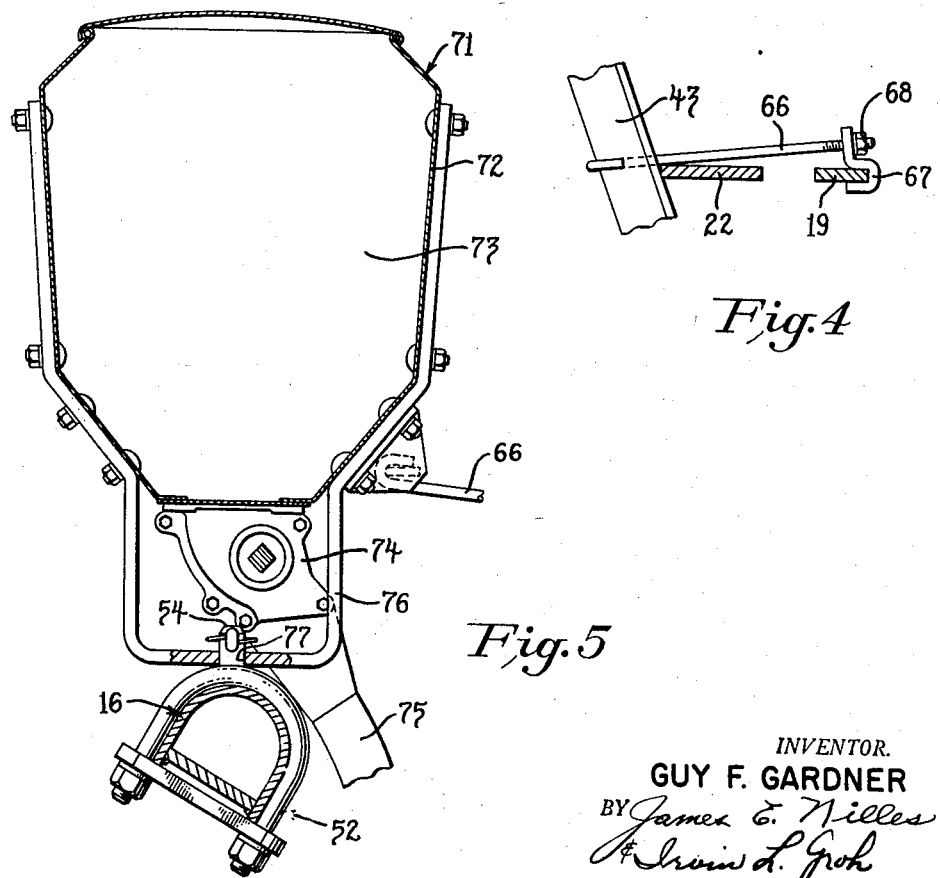
INVENTOR.
GUY F. GARDNER
ATTORNEYS.

United States Patent Office 2,907,396
Patented Oct. 6, 1959

2,907,396

LOAD TRANSPORTING ATTACHMENT FOR AGRICULTURAL IMPLEMENTS

Guy F. Gardner, Dearborn, Mich., assignor to Massey-Ferguson Inc., a corporation of Maryland Application May 21, 1956, Serial No. 586,177

4 Claims. (Cl. 172—611)

The present invention relates to attachments for agricultural implements and more particularly to a load transporting attachment for implements.

It is a general object of this invention to provide an improved load transporting attachment for implements which may be readily attached to and detached from the implement in a minimum amount of time.

It is a further object of the invention to provide a load transporting attachment for implements which may be readily adjusted from one position to another on the implement to change the distribution of the transported load on the implement.

More specifically, it is an object of the invention to provide a load transporting attachment for implements in which complementary connecting parts may be left in position on the transported structure and on the implement when the attachment is removed without interfering with further operation of the implement.

It is still another object to provide a load transporting attachment for implements in which means for securing the attachment to the implement also act to secure ground engaging elements to the implement.

The foregoing and other objects and advantages are attained by the present invention, various novel features of which will be apparent from the following description and from the accompanying drawings disclosing a preferred embodiment of the invention.

In the drawings:

Fig. 2 is a plan view of the implement and attachment shown in Fig. 1 mounted on the rear of a tractor, and in which only a rear portion of the tractor is shown;

Fig. 3 is an enlarged sectional view of a portion of the implement and attachment taken on line 3—3, Fig. 2;

Fig. 4 is an enlarged plan view, partly in section of a portion of the attachment and implement shown in Fig. 2; and Fig. 5 is a sectional view similar to Fig. 3 showing another form of a load transporting structure which may be attached to the implement.

Figure 1:
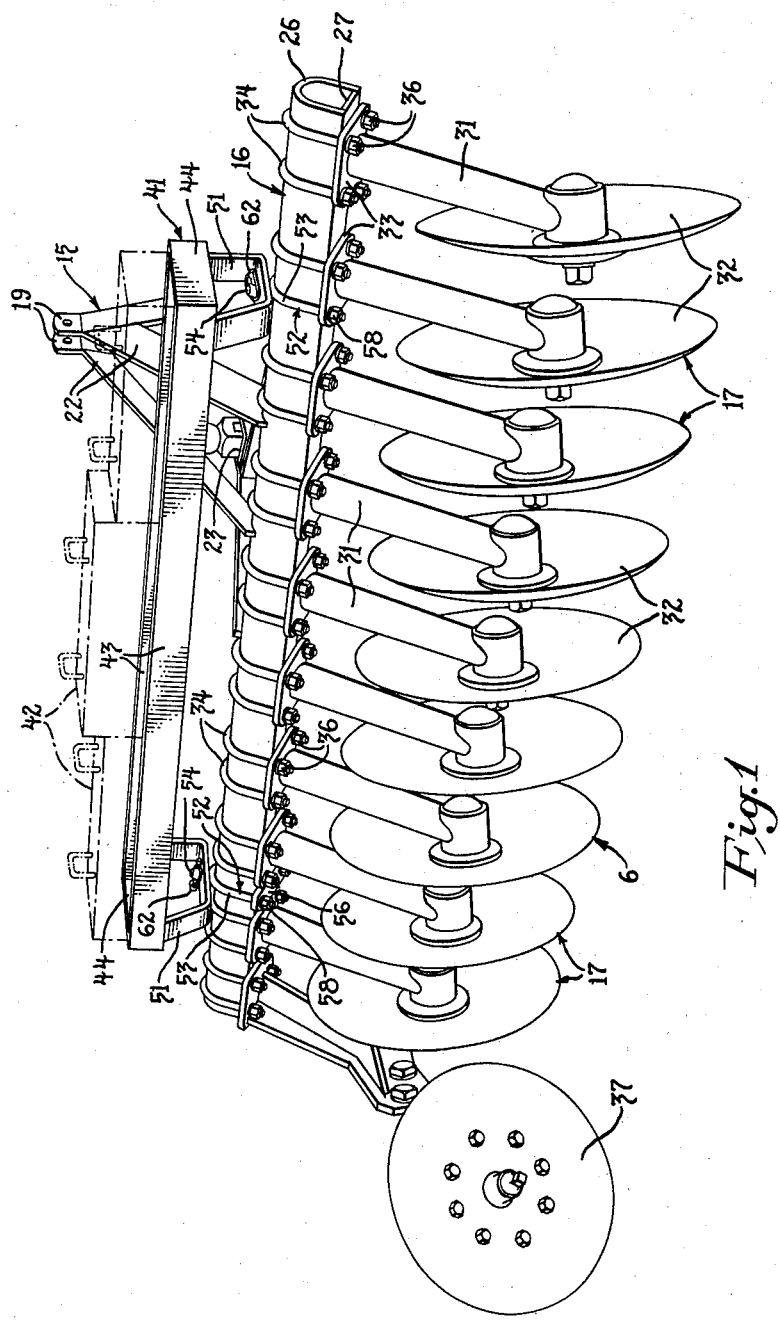
Fig. 1 is a perspective view of a disk tiller and load transporting attachment incorporating the principles of the present invention, taken from the right rear of the implement.

Referring to the drawing and particularly to Fig. 2, a disk 6 incorporating a preferred embodiment of the invention is shown attached to the rear portion of a tractor 7 in accordance with the teachings of my U.S. Patent No. 2,697,393. The tiller 6 is supported on the tractor for movement between ground working and transport position by a hydraulic system and a 3-point hitch system, which is described in detail in Ferguson U.S. Patent No. 2,118,180. For the purpose of this disclosure the hitch system may be considered as including an upper link 8 and a pair of lower links 9, which may be raised and lowered relative to the tractor by drop links 11 and arms 12 upon actuation of a hydraulic system (not shown) incorporated in the tractor.

The tiller 6 includes a main frame member or tool bar 16 on which a plurality of ground engaging disk assemblies 17 are mounted. The tool bar 16 is disposed at an angle to the direction of travel and is connected to the links 8 and 9 on the tractor through a hitch frame 15 including a drawbar 18 disposed transversely to the direction of travel and rigidly connected to the angled tool bar 16. A pair of strut members 19 are rigidly connected at one end to spaced portions on the drawbar 18 and converge upwardly relative to each other for pivotal connection at their upper ends to the tractor mounted link 8 as by a bolt 21. The struts 19 are held in a rigid upright position by means of brace members 22 rigidly connected at opposite ends to the struts 19 and to the tool bar 16. The opposite ends of the drawbar are provided with mounting brackets 23 to which corresponding draft links 9 are pivotally connected by pins 24. Upon actuation of the tractor hydraulic system, the links 9 move in response to movement of the lift arms 12 to raise and lower the tool bar 16 together with the disk assemblies 17 relative to the tractor.

Referring to Figs. 1 and 3, the tool bar 16 may be fabricated of a channel member 26 having a generally U-shaped cross section and a strap 27 welded to the legs of the U-shaped channel to form a rigid, generally tubular structure for supporting disk assemblies 17. As shown in Fig. 1, each of the disk assemblies 17 comprises a depending standard 31 rotatably supporting a concavo-convex disk 32 at its lower end. The upper end of each standard 31 is provided with a plate member 33 adapted to abut a flat surface of the tubular member 16 and to be rigidly secured to the latter by a pair of clamps in the form of U-bolts 34. The clamps or U-bolts 34 embrace the curved portion of the tubular member 26 and are provided with threaded portions, which pass through apertures in the plate members 33 and receive nuts 36. Upon tightening the nuts 36, the plate members 33 are clamped against the tool bar 16 and are held rigidly in position. It should be noted that disk assemblies 17 may be readily attached to and detached from the tool bar so that their number and spacing may be easily varied.

The tiller 6 may also be provided with a landside furrow wheel 37 supported on the tool bar 16 in position to absorb lateral forces imposed on the implement due to engagement of the disks 32 with the soil.

Referring to Figs. 1, 2 and 3 a load transporting attachment in the form of a weight box 41 is attached to the tiller 6. The weight box is adapted for quick attachment to the tiller in selected positions longitudinally of the tool bar 16 and may be utilized for the purpose of carrying loads in the form of stone or masonry ballast members 42, such as shown in outline in Fig. 1. By proper selection of a desired amount of ballast the soil penetration of the tiller disks 32 may be varied. Furthermore, by properly adjusting the position of the load transporting box 41 longitudinally of the tool bar 16 all of the disks 32 may be made to penetrate uniformly, or the disks at one end of the tiller may be made to penetrate more deeply than those at the other end.

More specifically, the weight box 41 comprises a rectangular frame having side members 43 and end members 44 all of angle iron, and a bottom portion of equally spaced strap members 46. The members 43, 44 and 46 are rigidly connected together as by welding to form a platform or box-like load supporting structure.

Means for attaching the box 41 to the tiller 6 include a pair of generally U-shaped brackets 51 rigidly connected at longitudinally spaced portions at the underside of the box 41 and a pair of complementary bracket supports 52 detachably connected in selected positions on the tiller bar 16.

The supports 52 associated with the tiller bar 16 are identical and detailed reference will be made to only one. As seen in Fig. 3, the support 52 includes a U-bolt 53 of the same form as the U-bolts connecting the disk assemblies 17 to the tiller bar and also a stud 54 rigidly attached to the U-bolt. The U-bolt portion of the support 52 is adapted to straddle the U-shaped channel member 26 of the bar 16 and is rigidly but detachably secured in position by a strap member 56 adapted to engage the underside of the tool bar 16. The strap member is provided with spaced openings to receive the threaded leg portions of the U-bolt 53 and is held in position by nuts 58. When the U-bolt 53 is placed in a selected position longitudinally of the bar 16, the nuts 58 may be tightened to hold the U-bolt in position with the stud 54 extending transversely of the bar, in a vertical position to pass through an aperture 61 in the associated box bracket 51. The stud 54 is provided with a transverse opening to receive a cotter key or quick detachable pin 62 for detachably connecting the bracket support 52 to the associated bracket member 51.

To attach the weight transporting box 41 to the tiller, supports 52 are fastened at spaced portions of the bar 16 so that the spacing of the studs 54 conforms to the spacing of the apertures 61 in the brackets 51. As shown in Fig. 1, the supports 52 may be attached to the bar 16 intermediate adjacent disk assemblies 17 as shown at the left end of the box 41. However, if desired, either of the pair of U-bolts 34 securing a particular disk assembly 17 to the tiller bar 16 may be removed and replaced by one of the attaching supports 52, as shown at the right side of the box 41, to fill the dual function of securing the disk assemblies in position and of positioning a stud 54 vertically. After the studs 54 are properly spaced, the box 41 may be placed in position with the apertures 61 receiving the studs 54 to hold the box in horizontally fixed relation relative to the tiller. Thereafter the pins 62 may be inserted to hold the box in vertically fixed position.

A third connection for stabilizing the box in a fore and aft direction is afforded between the front member 43 of the box 41 and strut members 19 of the hitch structure. Referring to Figs. 2 and 4, when the weight box is in position on the tiller bar 16, the member 43 abuts the brace members 22 forming part of the tiller hitch structure. The front member 43 is held in abutment with the brace members 22 by a hook-shaped bolt 66 having its hooked end engaging the front frame member 43 and its threaded end fitted through a bracket clip 67 on one of the struts 19. The bolt 66 is provided with a nut 68 which, upon tightening, engages the clip 67 and pulls the box 41 tightly against the brace members 22. In any adjusted position of the box longitudinally of the tiller bar 16, the hook-shaped bolt 66 will engage an adjacent portion of the frame member 43 to afford the necessary connection for stabilizing the box in a fore and aft direction.

In some tiller operations, such as in orchards and vineyards, it may be desirable to remove a few of the disk assemblies from one end of the tool bar 16. For example, as viewed in Fig. 2, two or more of the disk assemblies 17 at the right end of the bar 16 may be removed so that the tiller will operate similar to an offset harrow for working the areas under the branches and vines at one side of the tractor. In such operations it is sometimes desirable to seed the tilled soil area and a tiller mounted seeding attachment is ordinarily positioned over the group of ground engaging disks to accomplish this purpose. A cross section of seeder attachment 71 embodying the principles of the invention, and particularly adapted for use on an implement such as the tiller 16, is shown in Fig. 5. The attachment includes a seed box or bin 72 having seed storage space 73 and seed metering devices 74 secured to the bottom of the bin. A plurality of equally spaced seed spouts 75 (only one is shown) lead from the metering devices to direct the seed to the ground. Opposite ends of the box 72 are provided with a U-shaped bracket 76 similar to the brackets 51 associated with the weight box 41 illustrated in Figs. 1 and 3. Each bracket 76 is provided with an aperture 77 adapted to engage the stud 54 on the associated tiller mounted support 52. The forward portion of the seed box may be held against the brace members 22 by the hook-shaped bolt 66 in the same manner as the weight box 41. The seed box attachment 71 forms a load transporting structure which may be readily attached to and detached from the tiller bar 16 in the manner previously described.

Both of the load transporting attachments 41 and 71 may be readily removed from the tiller by removing the quick detachable pins 61 and the clamp means formed by the bolt 66, and thereafter lifting the attachment from its position on the tiller. When the load transporting attachments are not used the tiller associated supports 52 may be left in attached position without interference to tiller operation.

It will now be seen that there has been provided a load transporting attachment for implements which utilizes a simplified attaching means affording ready attachment to and detachment from the implement and also permits adjustment laterally of the implement to position the load transporting structure in the desired location relative to the ground engaging tools of the implement.

I claim as my invention:

1. A load transporting attachment for use with an agricultural implement having a hitch frame and an elongated tool bar of substantially uniform cross section, the combination comprising, an elongated load supporting structure adapted to be positioned on said tool bar and having at least one portion abutting said hitch frame, a pair of bracket members rigidly connected at spaced portions of said structure, respectively, complementary bracket supports conforming in shape to said bar and detachably connected at selected longitudinally spaced portions of said tool bar, each support having an upwardly projecting stud, said bracket members each presenting an aperture for receiving the stud on an associated bracket support, means engageable with said studs and cooperable with said brackets for retaining said studs in said apertures, and detachable clamp means associated with said supporting structure and engageable with said hitch frame for detachably retaining said one portion of said structure in abutting relation with said hitch frame.

2. In combination with an agricultural implement having an elongated tool bar and a hitch frame, a load transporting structure, means for detachably securing said structure to said tool bar comprising, a pair of U-shaped attaching supports adapted to straddle said tool bar at any selected position along said bar and each presenting a stud extending upwardly from said tool bar, attaching means associated with said U-shaped attaching supports and engageable with said tool bar for rigidly retaining said supports in selected spaced positions along said tool bar, a pair of complementary brackets rigidly connected to spaced portions of said structure and each presenting an aperture adapted to receive the stud on the associated one of said attaching supports and to retain said structure in horizontally fixed relation relative to said tool bar, additional means coacting with said complementary brackets and said studs to detachably retain the latter in their associated apertures and to secure said structure in vertically fixed relation on said tool bar, and clamp means connected with said hitch frame and to said structure at a point forwardly of said tool bar to prevent tilting movement of said structure relative to said implement.

3. An agricultural implement having a load transporting attachment comprising, in combination, an elongated tool bar of substantially uniform cross section, a plurality of clamps for securing a set of ground-engaging tools to said bar, said clamps conforming in shape to said tool bar and being selectably positionable therealong so that spacing of the tools may be varied along the bar, a box-like load supporting structure, a plurality of brackets mounted on said structure, and a plurality of bracket supports for connecting with the respective brackets and having portions similar in shape to said clamps so as to permit substitution therefor in clamping a tool to said bar, said supports and said brackets having releasable cooperating means for detachably mounting said structure on said bar.

4. An agricultural implement having a load transporting attachment comprising, in combination, an elongated tool bar of substantially uniform cross section, a hitch frame secured to and supporting said tool bar, a plurality of clamps for carrying a set of ground engaging tools on said bar, said clamps conforming in shape to said tool bar and being selectably positionable therealong so that spacing of the tools may be varied along the bar, a box-like load supporting structure, a pair of brackets mounted on said structure, a pair of bracket supports having portions similar in shape to said clamps so as to permit substitution therefor in clamping a tool to said bar, said supports and said brackets having releasable cooperating means for detachably mounting said structure on said bar, and detachable means for connecting said structure to said hitch frame so as to prevent tilting movement of said structure relative to said implement.

References Cited in the file of this patent

UNITED STATES PATENTS

| | | |
|---|---|---|
| 818,105 | Meredith | Apr. 17, 1906 |
| 1,020,983 | Heylman | Mar. 26, 1912 |
| 2,377,410 | Field | June 5, 1945 |
| 2,378,635 | Hyland | June 19, 1945 |
| 2,697,393 | Gardner | Dec. 21, 1954 |